US00RE37695E

(19) United States
(12) Reissued Patent
Leitenberger et al.

(10) Patent Number: US RE37,695 E
(45) Date of Reissued Patent: May 14, 2002

(54) MEASURING DEVICE FOR MEASURING WORKPIECES

(75) Inventors: Werner Leitenberger, Heidenheim; Sabine Ott, Nürnberg, both of (DE)

(73) Assignee: Carl-Zeiss-Stiftung (DE)

(21) Appl. No.: 09/496,033

(22) Filed: Jan. 25, 2000

Related U.S. Patent Documents

Reissue of:
(64) Patent No.: 5,901,455
Issued: May 11, 1999
Appl. No.: 08/833,989
Filed: Apr. 11, 1997

(30) Foreign Application Priority Data

Apr. 15, 1996 (DE) ..... 196 14 747

(51) Int. Cl.[7] ..... G01B 5/20; G01B 5/004
(52) U.S. Cl. ..... 33/503; 33/551
(58) Field of Search ..... 33/503, 1 M, 549, 33/551, 552, 555, 557, 559, 560

(56) References Cited

U.S. PATENT DOCUMENTS 4,833,789 A * 5/1989 Zona ..... 33/503
4,953,306 A * 9/1990 Weckenmann et al. ..... 33/503
5,009,512 A * 4/1991 Lessi et al. ..... 33/557
5,337,485 A * 8/1994 Chien

FOREIGN PATENT DOCUMENTS

| | | | | |
|---|---|---|---|---|
| DE | 44 36 827 | * | 10/1994 | |
| EP | 0026274 | * | 9/1980 | |
| EP | 0289983 | * | 3/1988 | |
| EP | 0368648 | * | 9/1989 | |
| EP | 0409267 | * | 7/1990 | |
| EP | 0470370 | * | 5/1991 | |
| JP | 4080601 | * | 3/1992 | ..... 33/503 |

* cited by examiner

*Primary Examiner*—Christopher W. Fulton

(57) ABSTRACT

A measuring device for the measurement of workplaces has a base frame with a workpiece receiver to receive a workpiece to be measured, and at least one measuring unit for the measurement of the workpiece. In order to utilize the measuring device as flexibly as possible, and permit the measurement of different workplaces in as simple a manner as possible, the measuring unit can be brought into at least two different positions.

20 Claims, 4 Drawing Sheets

MEASURING DEVICE FOR MEASURING WORKPIECES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a measuring device for measuring workplaces and more particularly to a measuring device which includes a base frame with a workpiece receiver to receive a workpiece to be measured, and at least one measuring unit to measure the workpiece.

2. Discussion of Prior Art

Such measuring devices are already well known in the state of the art. Thus there are, for example, so-called portal measuring devices which are usually constructed as follows. They include a base frame in the form of a baseplate, to which a workpiece receiver is fastened. By means of this, a workpiece to be measured can be fastened to the baseplate. A portal measuring unit is fastened to the baseplate, for measuring the workpiece, and includes two guides which are fastened laterally of the baseplate, and on which a portal is guided which completely spans the baseplate. The portal can be moved along the baseplate over the guides. The spanning portion of the portal has, for its part, guides on which a slide can be moved transversely of the baseplate. In addition, guides are also provided in the slide. By means of the guides, a measuring arm, with a sensing head located on the measuring arm, can be moved up and down. Thus the sensing head can be moved in three mutually orthogonal directions by means of the above-described mechanism of the portal measuring unit. By means of the position of the sensing head, a workpiece to be measured can be measured in the x-, y- and z-directions.

Furthermore, so-called stand measuring units are also known from the state of the art. The stand measuring devices are essentially distinguished from the portal measuring devices solely in the design of the measuring unit. In contrast to a portal measuring device, the measuring unit in this case has a stand which runs on a guide fastened laterally of the base frame, so that the stand can be moved along the baseplate. The stand is in turn provided with guides, so that a slide can be moved up and down on it. The slide is furthermore provided with guides, by means of which a horizontally oriented measuring arm, with a head fastened to it, can be moved transversely of the baseplate. Workpieces can likewise be measured in three mutually orthogonal directions, x, y and z, by means of the said stand measuring device.

The special feature of the measuring devices known from the state of the art is seen to be that the measuring devices are rigidly fastened in their position. Portal measuring devices, for example, have a measuring arm which is oriented perpendicularly to the baseplate and is thus lowered onto the workpiece to be measured, and therefore can measure measurement points which are difficult to reach, such as, for example, lateral bores in a workpiece, only by the use of relatively expensive sensing heads. In particular, problems arise when different workplaces with differing geometry are frequently measured with one and the same measuring device, since for this purpose many special sensing heads often have to be provided.

SUMMARY OF THE INVENTION

The present invention thus has as its object to develop the known measuring devices in such a manner that the measurement, with one and the same measuring device, of different workplaces having differing geometries is thereby simplified.

The object is attained according to the invention by a measuring device for measurement of workplaces including a base frame, having a workpiece receiver for receiving a workpiece to be measured, and at least one measuring unit for measurement of a workpiece, wherein the measuring unit can be arranged in at least two different positions.

The measuring device for measuring a workpiece can be brought into at least two different positions. The particular advantage arises from this that the measuring unit can be arranged, corresponding to the workpiece to be measured, in such a manner that the point on the workpiece to be measured can be reached by the sensing head as easily as possible. Furthermore, two or more measuring units may be installed in the measuring device, according to requirements, so that on the one hand each of the measuring units can optimally measure certain regions of the workpiece to be measured, and on the other hand that the total time for the measurement of a workpiece is reduced, since two or more measuring units measure simultaneously.

In a first embodiment of the measuring device, the measuring unit can be rigidly fastened to the base frame in at last two different positions. To change the position, it is thus necessary to release the rigid connection and to rigidly fasten the measuring unit again, in another position. The rigid connection between the measuring units and the base frame can be produced by fastening the measuring unit to at least one portion the base frame, which fixes the measuring unit in its position. The portion which fixes the measuring unit can have very varied embodiments, and can for example be provided in the form of side members which are arranged laterally of the measuring unit. The measuring unit can be rigidly connected to the side members by fastening means such as screws, for example. The side members can however also be provided in the form of narrow, support surfaces on which the measuring units are placed and to which the measuring units are screwed.

In a second embodiment according to the invention, the measuring unit is movably fastened to the base frame of the measuring device. The base frame here has special fittings by means of which the measuring unit can be moved into at least two different positions. These fittings can, for example, be guides, along which the measuring unit can be pushed. The guides can be either straight or have a curved shape. A hydraulic lifting device, for example, can also be used, which raises or lowers the measuring unit and which advantageously has an additional mechanism, likewise controlled hydraulically, for tilting the measuring unit in at least one direction.

BRIEF DESCRIPTION OF THE DRAWINGS

Further advantages and developments of the invention are explained in the following description of preferred embodiments, taken together with the accompanying drawings, in which.

DETAILED DESCRIPTION OF PREFERRED EMBODIMENTS

Figure 1:
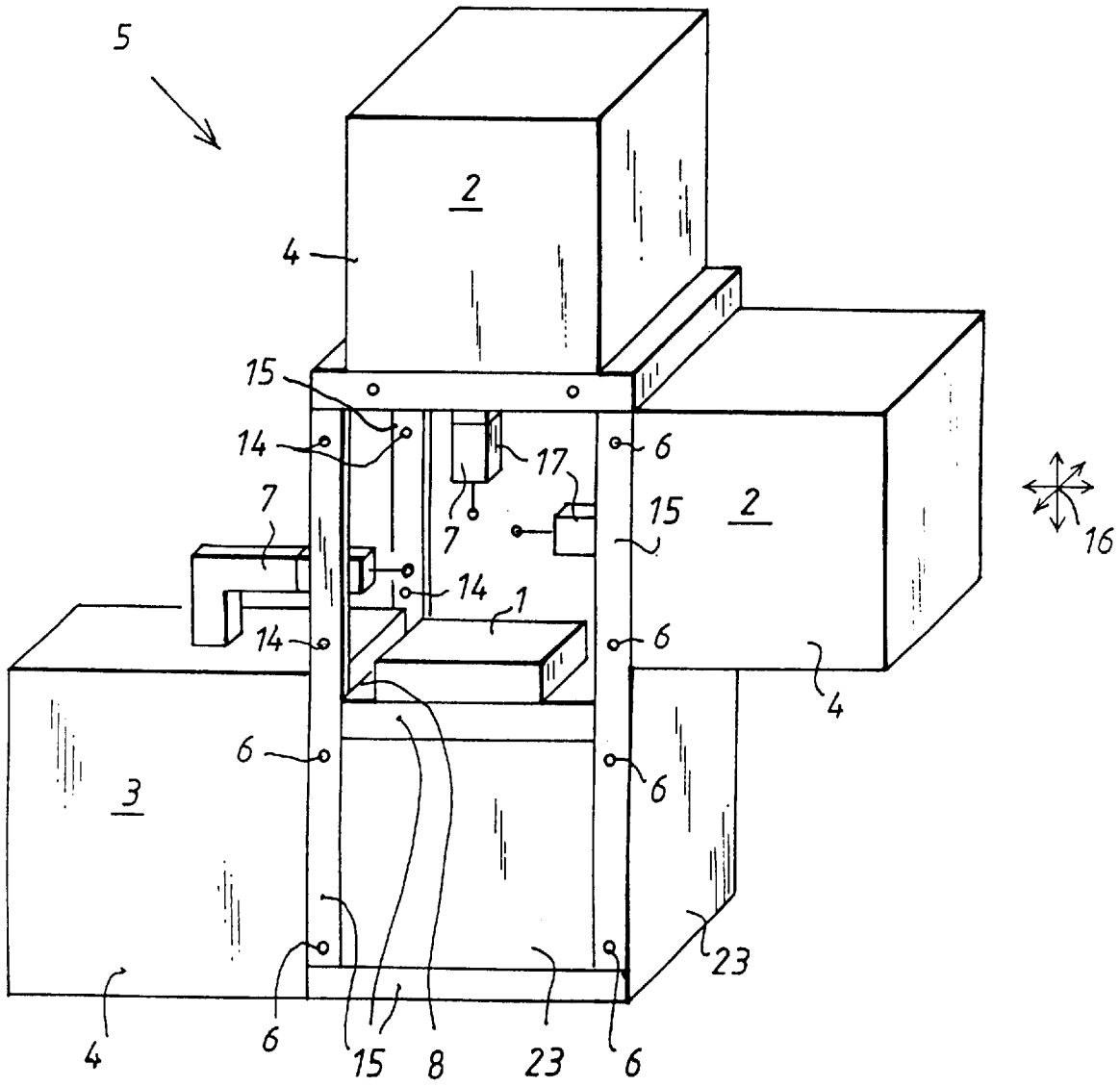
FIG. 1 shows a measuring device with side members of rectangular shape for the rigid fastening of a measuring unit.
Figure 2:
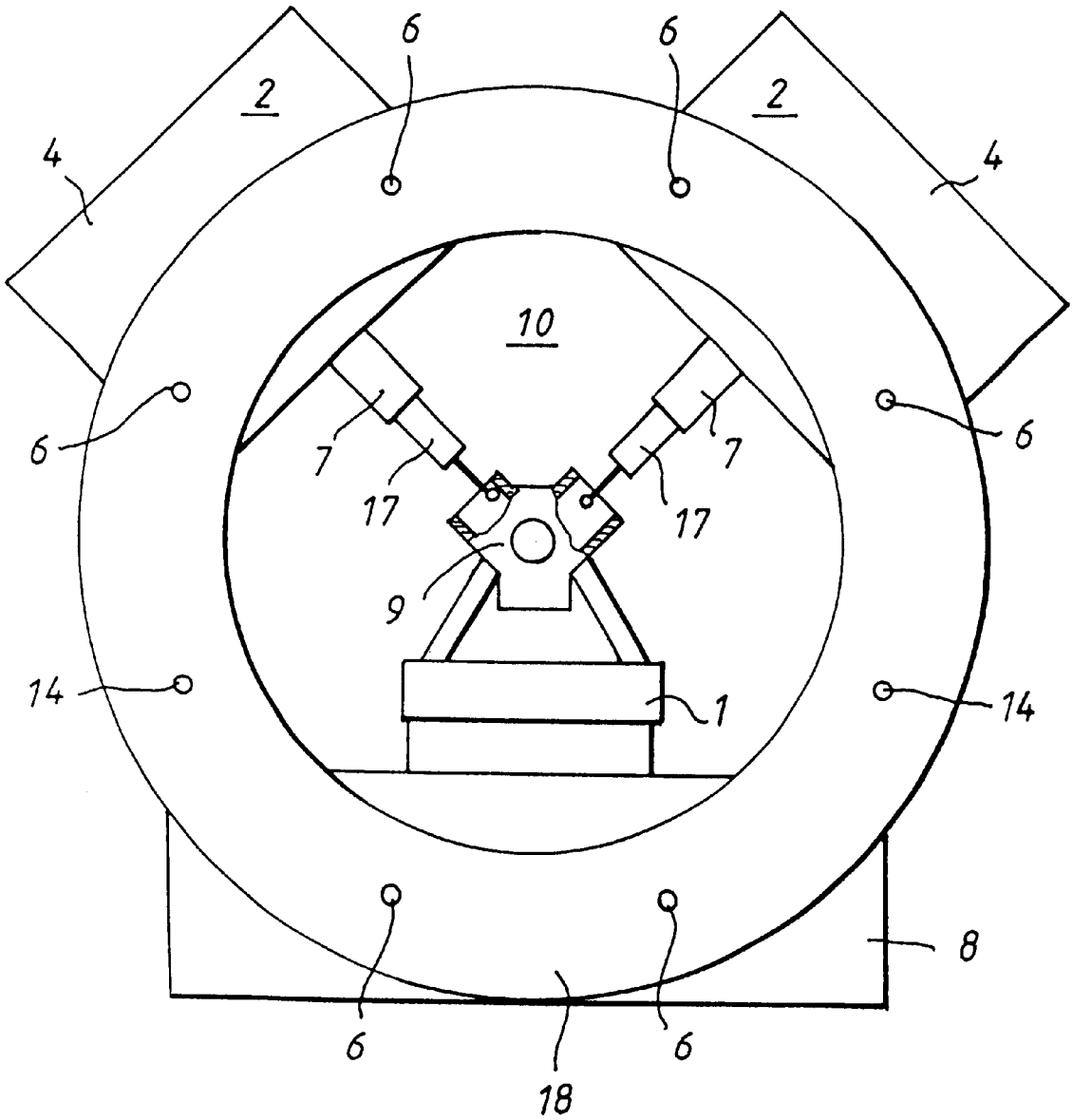
FIG. 2 shows a measuring device with side members of round shape, for the rigid fastening of a measuring unit.
Figure 3:
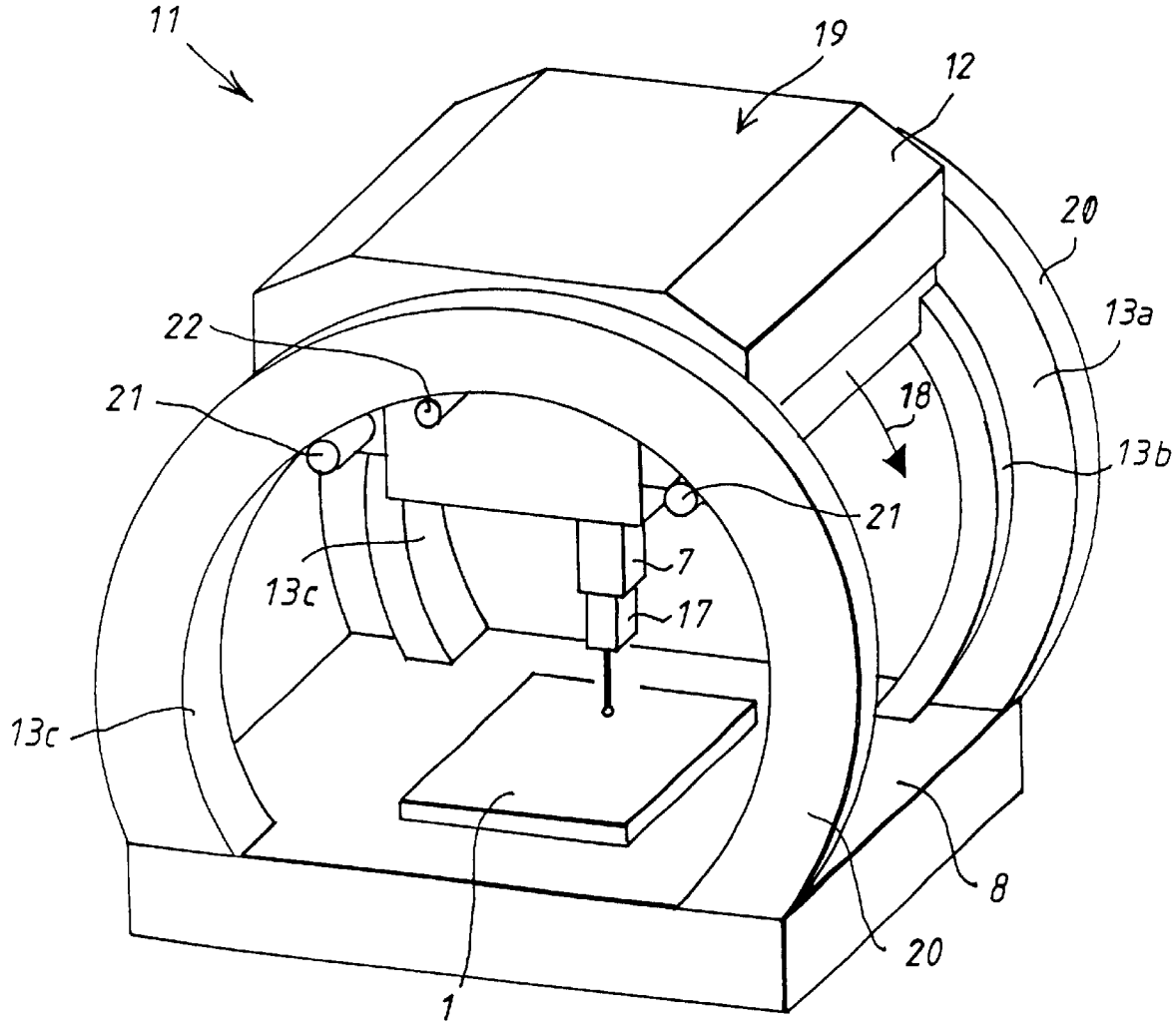
FIG. 3 shows a measuring device with guides for movable fastening of a measuring unit.

FIG. 1 shows a measuring device for measuring workplaces according to the invention. It should be mentioned at this point that FIGS. 1–3 are merely illustrative diagrams to show the principle; they are not to scale, and details which are unimportant for the invention have been omitted from them throughout. The measuring device shown in FIG. 1 is respectively constituted such that the measuring units (2, 3) can be rigidly fastened, in at least two different positions, to a base frame (side members 15, cover plate 23, baseplate 8) of the measuring device. For this purpose, the base frame of the measuring device has, among other things, two substantially oppositely positioned side members (15) having a rectangular shape, to which the measuring units (2, 3) are rigidly fastened. For this purpose, many holes (14), only some of which are shown here, are provided, through which the measuring units (2, 3) can be connected rigidly to the side members (15) by means of screws (6). The holes of this embodiment are respectively provided in the side members such that the holes have equal spacings in pairs. Holes are likewise correspondingly provided in the sidewalls of the container (4) of the measuring units (2, 3), so that the containers can be fastened to the side members (15) in their optimum position. After removal of the measuring unit (3), one of the two measuring units (2), or an additional measuring unit (2), can immediately be mounted in the holes, which are now free, of the side member (15).

The base frame of the measuring device has, in addition to the side members (15), the cover plates (23) which are fastened to the side members (15) by fastening devices, not shown here in more detail, such as screws. In addition, a baseplate, (8), embodied here as a block, is also located between the side members (15), and has a workpiece receiver (1) fastened to it. This serves to receive the workpiece which is to be measured. The workpiece receiver in this particular embodiment is constituted as a flat plate on which the workpiece to be measured can be arranged. The workpiece receiver (1) can of course be embodied in other ways. For example, a clamping device, by means of which the workpiece to be measured can be clamped, can also be provided on the plate shown here.

The measuring units (2, 3) are shown only schematically, for the sake of simplicity. They include containers (4) which serve to enclose the measuring units (2, 3), and measuring arms (7) which have a sensing head (17) located at their tip for the measurement of a workpiece which is to be measured. The measuring arms (7) are here connected in the containers (4) with a corresponding mechanism so that the measuring arms (7) can be moved in three mutually orthogonal directions x, y and z (see arrow 16). Such a mechanism can be incorporated in connection with the portal measuring devices or the stand measuring devise. The workpiece to be measured can thereby be measured, in that the tips of the sensing heads (17) touch the corresponding places of the workpiece to be measured, and for this purpose the deflection in the different axes x, y and z is measured with respect to a reference point. Measuring units of this kind have been known for a long time, and are produced, for example, by the Firm of Carl Zeiss, so that a detailed description of the measuring units (2, 3) and their associated mechanisms and electronics will be omitted.

FIG. 2 shows a development of the measuring device according to FIG. 1, and represents a particularly advantageous embodiment of the invention. In the measuring device (10) shown, a base frame is likewise provided, and the measuring units (2) can be fastened in at least two positions. In the embodiment shown, the side members (18) are in circular annular form, and are provided with numerous holes (14) which all have the same spacing. As already described in connection with FIG. 1, the measuring units (2), which are constructed analogously to the measuring units (2) of FIG. 1, are rigidly fastened to the side members (18) by means of screws (6) and associated nuts, which are not shown in detail here. The base frame of the measuring device (10) according to FIG. 2 has, besides the side members (18), a baseplate, (8) which is likewise rigidly connected to the side members (18) by means of screws (6). A workpiece receiver (1), not further described here, is located on the baseplate, (8), and for sake of example an engine block (9), with cylinders arranged in a V, is located on it. For better understanding, two of the cylinders are shown in partial sectional view, in order to be able to show how the tips of the sensing heads scan the bores of the cylinders.

The measuring device shown in FIG. 2 has the advantage over the measuring device shown in FIG. 1 that the measuring arms (7) and thus the sensing heads (17) can be arranged, not only perpendicular or parallel to the baseplate, (8), but also in positions between these two regions. As illustrated in FIG. 2 simple sensing heads can be used to measure without problems, for example, bores for which special, expensive sensing heads would be required for measurement with a measuring arm (7) oriented perpendicular or parallel to the baseplate, (8). The setting of the angle at which the measuring arm (7) is oriented with respect to the baseplate, (8) can be adjusted even more finely if additional further pairs of bores with a defined spacing are provided in the side members (18). For small regions, a particularly fine adjustment of the said angle can be made when the corresponding bores are provided in the form of slotted holes, making possible a fine adjustment of the measurement units (2) in these slotted holes.

FIG. 3 shows a second embodiment of a measuring device according to the invention. The measuring unit (19) shown here is fastened to the base frame (baseplate, 8, side members 20) movably by means of guides , 13b, 13c). The guides (13b, 13c) have a curved shape in this case, so that when the container (12) moves along the guides (13a, 13b), the angle of the measuring arm (7) and of the sensing head (17) relative to the baseplate, (8) changes continuously. In order to be able to move the container (12) of the measuring unit (19) over the guides (13a, 13b, 13c), the container (12) has rubber-coated rollers, not shown in more detail here, which run on the guides (13a, 13b), and are driven by a stepping motor which is correspondingly provided in the measuring unit (19). In order to ensure a more secure holding of the container (12), additional free-running rollers (21) are provided on the guides (13c), and are pressed against the guides (13c) and thus ensure that the rubber-coated rollers stay on the guides (13b). In addition, a clamping device is provided in the measuring unit (19) and can temporarily connect the measuring unit (19) rigidly to the guides (13c), and thus of course to the base frame also baseplate, 8, side members 20). A clamping device of this kind is provided here in the form of two rubber blocks (22) which are pressed, under respective electronic control, onto the guides (13c) of the side members (20), so that the measuring unit (19) is rigidly connected, depending on the adhesive force, to the guides (13c) and thus to the base frame (baseplate, 8, side members 20). This results in the advantage that the measuring unit (19) can be fixed in position in a defined manner for a long period of time without any problems.

Although the measuring device shown in FIG. 3 is relatively expensive in comparison with the measuring devices shown in FIGS. 1 and 2, it has, however, the particular advantage that the angle of the measuring arm (7) and of the sensing head (17) with respect to the baseplate, (8) is capable of very fine and also very rapid adjustment by means of a corresponding electronic control, so that the measuring device shown in FIG. 3 is flexible with regard to the measurement of different workplaces with differing geometry. Thus the measuring device which is shown is particularly suitable for use in testing sequences in which there are frequent alterations of the geometry of the workplaces to be measured.

Figure 4:
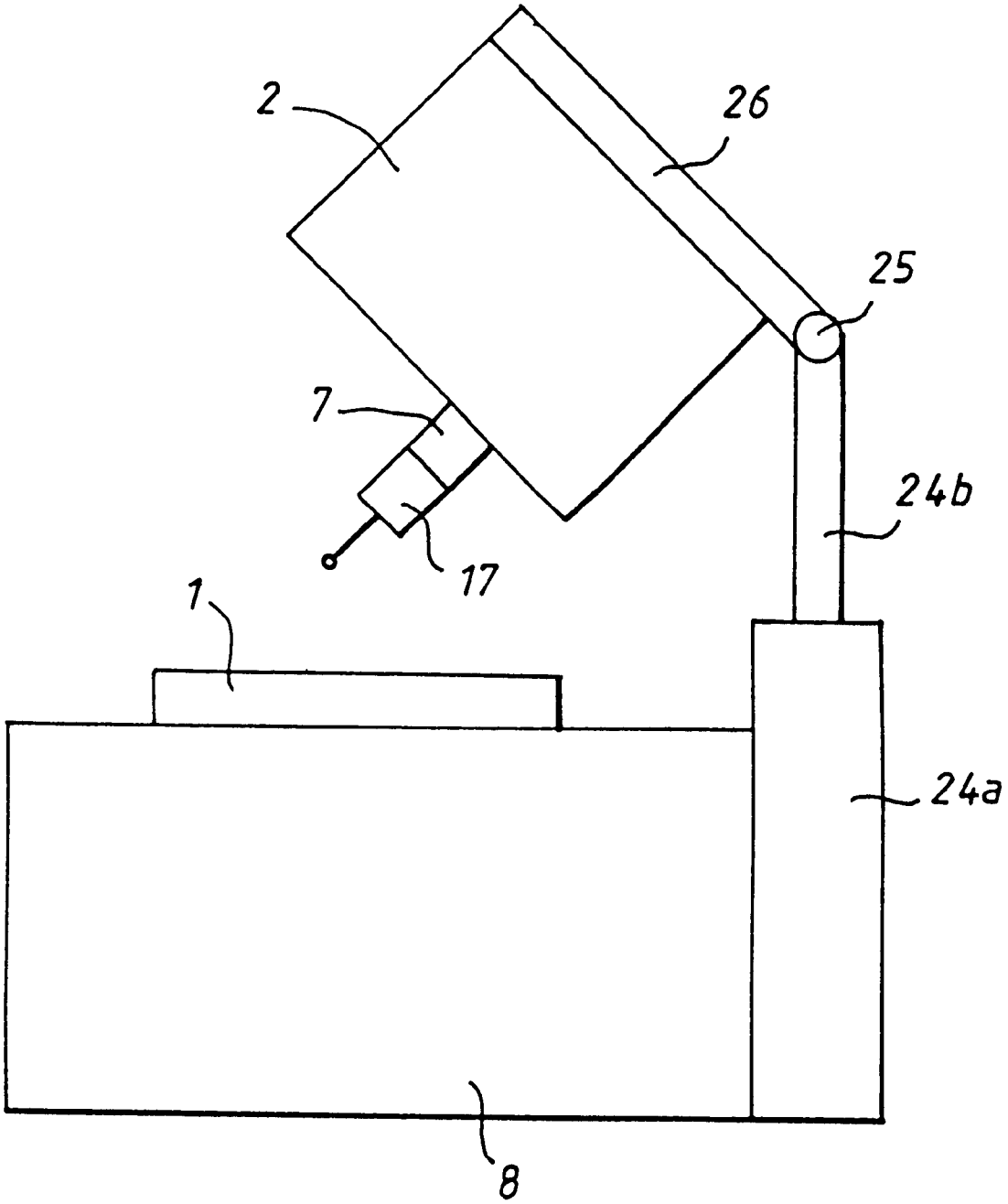
FIG. 4 shows a measuring device with a lifting device (24a, b) and a tilting device (25).

In a third embodiment, which is shown in FIG. 4, the measuring unit (2) can likewise be movably fastened to the base frame, in that this is fastened to a lifting device (24a, b) which can raise the measuring unit (2). In order to be able to change the angle of the measuring arm (7) and of the sensor of the measuring unit with respect to the baseplate, (8), the lifting device (24a, b) in addition has a tilting device (25) with which the measuring unit (2) can be tilted in at least one direction. For example, as is already well known to one skilled in the art, a hydraulically controlled lifting stage can be provided, and in addition a tiltable plate is provided on the lifting stage and can likewise be tilted by a hydraulic mechanism. The measuring unit can be mounted on the tiltable plate (26).

The invention is not limited to the embodiments which have been described, and it goes without saying that it encompasses all modified embodiments of the invention. Thus, for example, the measuring unit does not have to be embodied as generally described above, such that the measuring arm is movable with the sensing head in three mutually orthogonal directions x, y and z, but measuring devices can also be provided, for example, in which the sensing head is movable only in one or two directions. Furthermore, the toot carriers which have been shown can of course also be designed corresponding to the requirements, and can be embodied, for example, in the form of a rotary table or in the form of a pallet system. Furthermore, the base frame does not have to consist, as generally shown, of a baseplate, and side members, but can of course also be constituted in other ways. In addition, the sensing heads do not have to be embodied as contacting sensing heads, but can, for example, be provided as optical sensing heads.

As can be seen from FIGS. 1–4, the measuring devices (2, 3, and 13) can be brought into different positions such that the angle between the longitudinal axis of the measuring arm (7) concerned and a horizontal plane whose alignment is defined by the surface on which the base frame is set up, is different in the different positions.

We claim:

1. A measuring device for measurement of workplaces comprising:

a base frame having a workpiece receiver for receiving a workpiece to be measured, at least one measuring unit for measurement of a workpiece[with], said measuring unit comprising a measuring arm positionable in three mutually orthogonal directions, and two upwardly oriented, substantially opposite side members having a curved shape to which said measuring unit is fastenable in at least two different positions so that the angle between the longitudinal axis of said measuring arm and a horizontal plane is different in said different positions and include angles unequal to 0 degrees and 90 degrees.

2. A measuring device according to claim 1, further comprising a container (4) in which said measuring unit is embedded, said container being fastenable in said at least two different positions to said side members.

3. A measuring device according to claim 2, further comprising screws by which said container (4) is fixed to said side members.

4. A measuring device according to claim 3, wherein said screws penetrate said side member through slotted holes, for fine adjustment of said measurement unit[s].

5. A measuring device for measurement of workplaces comprising:

a base frame having a workpiece receiver for receiving a workpiece to be measured, at least one measuring unit for measurement of a workpiece, said measuring unit comprising a measuring arm positionable in three mutually orthogonal directions, and two upwardly oriented substantially opposite guides having a curved shape and being secured to said base frame, said measuring unit being movably fastened on said guides so that said measuring unit is arrangeable in at least two different positions in which the angle between the longitudinal axis of said measuring arm and a horizontal plane is different in said at least two different positions and includes angles unequal to 0 degrees and 90 degrees.

6. A measuring device according to claim 5, further comprising a container (4) in which said measuring unit is embedded, said container being movably fastened on said guides.

7. The measuring device according to claim 5, further comprising clamping devices for temporarily rigidly connecting said measuring unit to said base frame.

8. The measuring device according to claim 7, wherein said clamping devices comprise blocks that are pressed onto said guides for clamping.

9. The measuring device according to claim 6, further comprising rollers via which said container is movably fastened to said guides.

10. The measuring device according to claim 9, wherein some of said rollers are motor driven.

*11. A measuring device for measurement of workpieces, comprising:*

*a base frame having a workpiece receiver for receiving a workpiece to be measured,*

*at least one measuring unit for measurement of a workpiece, said measuring unit comprising a measuring arm positionable in three mutually orthogonal directions, and*

*at least one upwardly oriented side member to which said measuring unit is fastenable in at least two different positions so that the angle between the longitudinal axis of said measuring arm and a horizontal plane is different in said different positions and include angles unequal to 0 degrees and 90 degrees.*

*12. A measuring device according to claim 11, further comprising a container (4) in which said measuring unit is embedded, said container being fastenable in said at least two different positions to said at least one side member.*

*13. A measuring device according to claim 12, further comprising screws by which said container (4) is fixed to said at least one side member.*

*14. A measuring device according to claim 13, wherein said screws penetrate said side member through slotted holes, for fine adjustment of said measurement unit.*

*15. A measuring device for measurement of workpieces, comprising:*

*a base frame having a workpiece receiver for receiving a workpiece to be measured,*

*at least one measuring unit for measurement of a workpiece, said measuring unit comprising a measuring arm positionable in three mutually orthogonal directions, and*

*at least one upwardly oriented guide having a curved shape and being secured to said base frame,*

*said measuring unit being movably fastened on said guide so that said measuring unit is arrangeable in at least two different positions in which the angle between the longitudinal axis of said measuring arm and a horizontal plane is different in said at least two different positions and includes angles unequal to 0 degrees and 90 degrees.*

*16. A measuring device according to claim 15, further comprising a container (4) in which said measuring unit is embedded, said container being movably fastened on said at least one guide.*

*17. A measuring device according to claim 15, further comprising clamping devices for temporarily rigidly connecting said measuring unit to said base frame.*

*18. A measuring device according to claim 17, wherein said clamping devices comprise blocks that are pressed onto said at least one guide for clamping.*

*19. The measuring device according to claim 16, further comprising rollers via which said container is movably fastened to said at least one guide.*

*20. The measuring device according to claim 19, wherein some of said rollers are motor driven.*

* * * * *